(12) United States Patent
Bang et al.

(10) Patent No.: US 8,688,340 B2
(45) Date of Patent: Apr. 1, 2014

(54) APPARATUS AND METHOD FOR SUPPLEMENTING BRAKE VACUUM PRESSURE

(75) Inventors: Junghwan Bang, Hwaseong-si (KR); Sejun Kim, Seoul (KR); Chongah Gwon, Hwaseong-si (KR); Jiyong Yu, Pocheon-si (KR)

(73) Assignee: Hyundai Motor Company, Seoul (KR)

( * ) Notice: Subject to any disclaimer, the term of this patent is extended or adjusted under 35 U.S.C. 154(b) by 319 days.

(21) Appl. No.: 13/288,557

(22) Filed: Nov. 3, 2011

(65) Prior Publication Data

US 2012/0141299 A1 Jun. 7, 2012

(30) Foreign Application Priority Data

Dec. 1, 2010 (KR) .................. 10-2010-0121688

(51) Int. Cl.
*B60T 13/16* (2006.01)
*B60T 13/18* (2006.01)
*B60T 13/46* (2006.01)

(52) U.S. Cl.
USPC ............... 701/70; 701/67; 303/10; 303/11; 303/12

(58) Field of Classification Search
USPC ........ 701/67; 303/10, 11, 12; 417/199.1, 223, 417/319
See application file for complete search history.

(56) References Cited

U.S. PATENT DOCUMENTS

2003/0094317 A1* 5/2003 Takizawa et al. ............ 180/53.8

FOREIGN PATENT DOCUMENTS

| JP | 60-142030 A | 7/1985 |
|---|---|---|
| JP | 2000-313253 A | 11/2000 |
| JP | 2001-301606 A | 10/2001 |
| JP | 2007-107422 A | 4/2007 |
| KR | 1999-0043383 A | 6/1999 |
| KR | 10-0387856 B1 | 6/2003 |
| KR | 10-2009-0064177 A | 6/2009 |

OTHER PUBLICATIONS

Machine Translation of JP 2007-107422.*

* cited by examiner

*Primary Examiner* — John R Olszewski
*Assistant Examiner* — Daniel Johnson
(74) *Attorney, Agent, or Firm* — Morgan, Lewis & Bockius LLP

(57) ABSTRACT

An apparatus for supplementing a brake vacuum pressure may include an engine control unit (ECU) that generates a vacuum pressure control signal for supplementing the brake vacuum pressure in accordance with the result of determining whether the brake vacuum pressure is included in a reference vacuum pressure range after a vehicle implements an ISG process, a sub-oil pump that is operated in accordance with a control signal from the ECU to supply hydraulic pressure to the inside of an automatic transmission after the vehicle implements the ISG process, a vacuum pump that generates and supplies the brake vacuum pressure to a brake system, and an electronic clutch that selectively couples the sub-oil pump and the vacuum pump to allow driving force of the sub-oil pump to be transmitted to the vacuum pump or to be cut, in accordance with whether the vacuum pressure control signal is sent thereto.

10 Claims, 4 Drawing Sheets

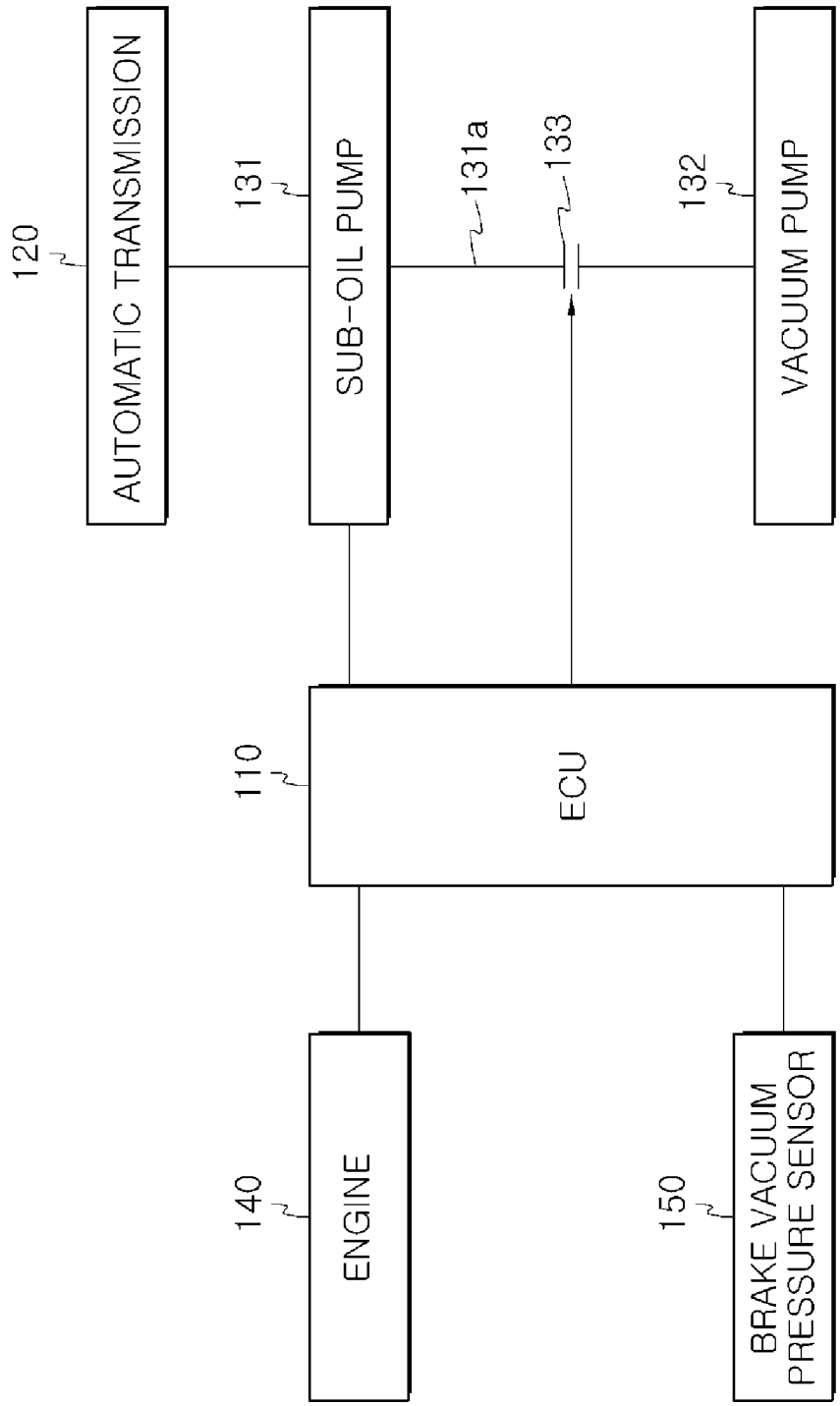

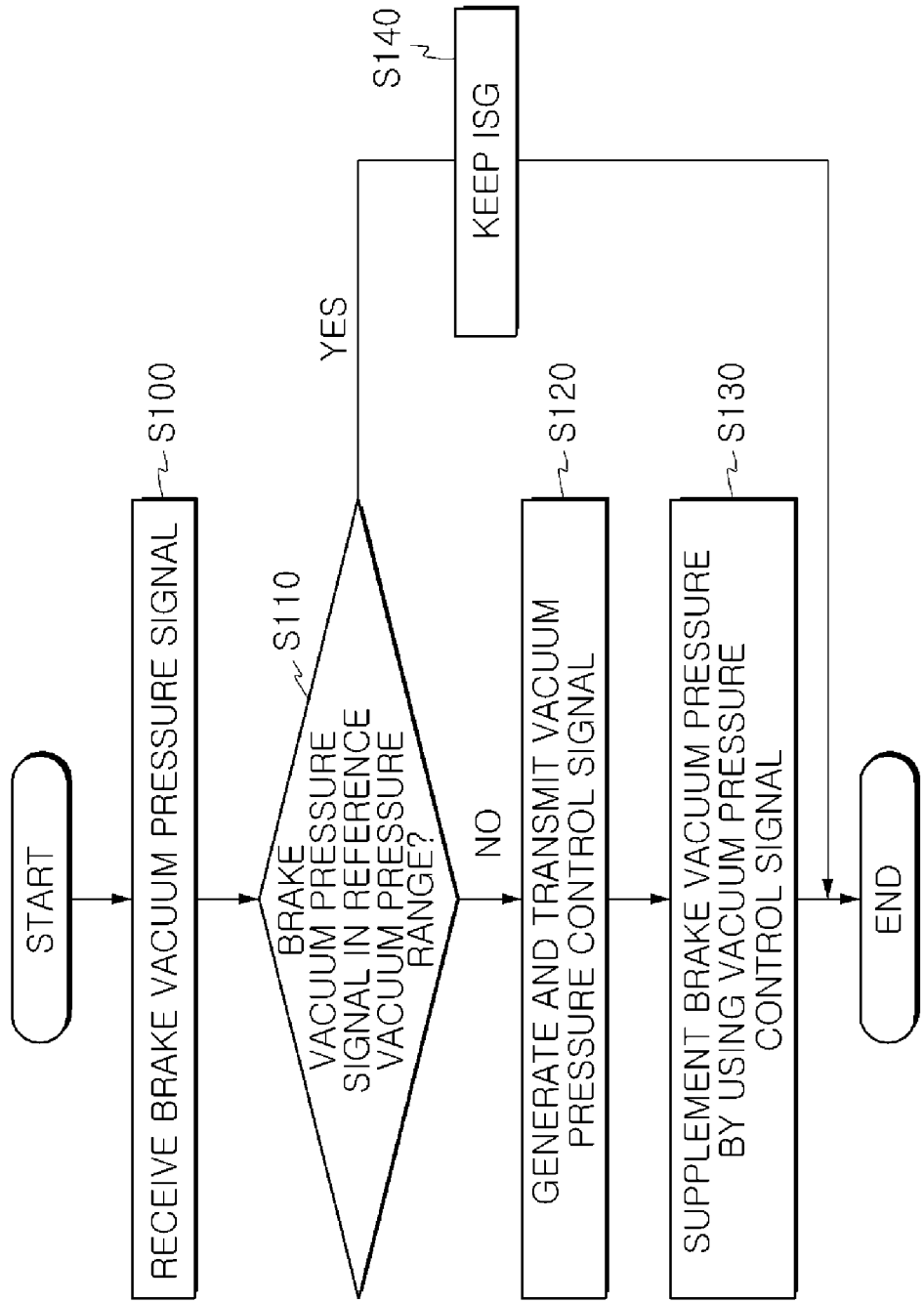

APPARATUS AND METHOD FOR SUPPLEMENTING BRAKE VACUUM PRESSURE

CROSS-REFERENCE TO RELATED APPLICATIONS

The present application claims priority to Korean Patent Application Number 10-2010-0121688 filed Dec. 1, 2010, the entire contents of which application is incorporated herein for all purposes by this reference.

BACKGROUND OF THE INVENTION

1. Field of the Invention

The present invention relates to an apparatus and a method for controlling brake vacuum pressure, and more particularly, to an apparatus and a method for controlling brake vacuum pressure to supplement brake vacuum pressure that becomes insufficient by stopping operation of an engine to implement ISG.

2. Description of Related Art

A technology about an idle stop and go (ISG) system for improving fuel efficiency has been under focus with the increase in concern about the fuel efficiency of vehicles.

A technology for reducing fuel consumption in an idle operation state of an engine by stopping the operation of the engine in the idle operation state in accordance with ISG conditions when a vehicle stops has been proposed, in an ISG system of the related art. The ISG conditions include the information on a battery system, the engine, the information on a transmission system, and the information on a request for implementing ISG by a driver etc.

The operation of the ISG system is as follows.

Referring to FIG. 1, when a vehicle stops, an engine control unit (ECU) 12 determines whether to implement ISG by checking a signal of various ISG-related variables (14) and a brake vacuum pressure signal transmitted from a brake vacuum pressure sensor 13 and reduces fuel consumption by stopping the operation of an engine 11 in an idle operation state in accordance with the conditions after implementing the ISG. The ISG conditions include engine 11, the information on a battery system (not shown), a transmission system (not shown), brake vacuum pressure transmitted from a brake vacuum pressure sensor 13, and the information on the user's intention of control etc.

However, when the operation of engine 11 stops, a brake is operated by the operation of a brake booster and a master cylinder which use the vacuum pressure of engine 11, such that there is a problem that it is not possible to increase again the vacuum pressure even if the vacuum pressure reduces after engine 11 stops. That is, as the brake vacuum pressure cannot be increased again, the vehicle cannot implement ISG.

Meanwhile, as shown in FIG. 2, when it is determined whether the vacuum pressure of the brake decreases under a predetermined reference range after the ISG is implemented (S10), the ISG is maintained (S20) when the vacuum pressure does not decrease under the predetermined reference range, but the engine is forced to restart when the vacuum pressure decreases under the predetermined reference range.

As described above, in the related art, since a vehicle is forced to restart for safety when vacuum pressure decreases under a predetermined reference range by continuous operation of a brake pedal under unexpected circumstances after the vehicle stops or implements ISG, the time for keeping the ISG to improve fuel efficiency reduces and reliability of the system is deteriorated by the forcible restart.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an apparatus and a method for controlling brake vacuum pressure which supplement brake vacuum pressure that becomes insufficient when the operation of an engine stops by implementing ISG.

In an aspect of the present invention, the apparatus for supplementing a brake vacuum pressure, may include an engine control unit (ECU) that generates a vacuum pressure control signal for supplementing the brake vacuum pressure in accordance with the result of determining whether the brake vacuum pressure is included in a reference vacuum pressure range after a vehicle implements an idle stop and go (ISG) process, a sub-oil pump that is operated in accordance with a control signal from the ECU to supply hydraulic pressure to the inside of an automatic transmission after the vehicle implements the ISG process, a vacuum pump that generates and supplies the brake vacuum pressure to a brake system, and an electronic clutch that selectively couples the sub-oil pump and the vacuum pump to allow driving force of the sub-oil pump to be transmitted to the vacuum pump or to be cut, in accordance with whether the vacuum pressure control signal is sent thereto.

The vacuum pressure control signal may include a desired rotation speed signal including information of a revolution per minute (RPM), which is set for the brake vacuum pressure to be supplemented and a clutch control signal for controlling the electronic clutch.

The ECU keeps the ISG process while the brake vacuum pressure is determined to be stable when the brake vacuum pressure is included in the reference vacuum pressure range.

The ECU generates the vacuum pressure control signal to the electronic clutch while the brake vacuum pressure is determined to be unstable when the brake vacuum pressure is not included in the reference vacuum pressure range.

In another aspect of the present invention, a method of supplementing a brake vacuum pressure in an apparatus for supplementing the brake vacuum pressure which may include a sub-oil pump and a vacuum pump selectively connected to a driving shaft of the sub-oil pump through an electronic clutch, may include determining whether the brake vacuum pressure is included in a reference vacuum pressure range after a vehicle implements an idle stop and go (ISG) process, generating a vacuum pressure control signal to the electronic clutch to supplement the brake vacuum pressure in accordance with the determined result, operating the vacuum pump by using driving force of the sub-oil pump, by transmitting the vacuum pressure control signal to the electronic clutch when the brake vacuum pressure is determined to be in the reference vacuum pressure range, and supplying the brake vacuum pressure generated from the vacuum pump to a brake system.

The determining may include keeping the ISG process while that the brake vacuum pressure is determined to be stable when the brake vacuum pressure is included in the reference vacuum pressure range, and generating the vacuum pressure control signal while the brake vacuum pressure is determined to be unstable when the brake vacuum pressure is not included in the reference vacuum pressure range.

The vacuum pressure control signal may include a desired rotation speed signal including an RPM (Revolution Per Minute), which is set for the brake vacuum pressure to be supplemented and a clutch control signal for controlling the electronic clutch connecting the sub-oil pump with the vacuum pump.

According to exemplary embodiments of the present invention, it is possible to keep brake vacuum pressure more stable and achieve operation even when the operation of an engine stops, by disposing a vacuum pump on the same shaft as a sub-oil pump mounted to supplement the internal hydraulic pressure of an automatic transmission which becomes insufficient when the operation of the engine stops due to implementation of ISG, by generating brake vacuum pressure by operating the vacuum pump with power of the sub-oil pump, and supplementing the brake vacuum pressure that becomes insufficient due to stop of the operation of the engine with the vacuum pressure generated as described above.

Further, according to exemplary embodiments of the present invention, since the brake vacuum pressure is maintained in a stable range even if the operation of the engine stops due to implementation of ISG, such that the time for keeping the ISG to improve fuel efficiency may increase and forcible restart of the engine due to the lack of brake vacuum pressure under ISG is prevented, such that it is possible to improve reliability of a vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a diagram schematically illustrating an apparatus for controlling brake vacuum pressure according to an exemplary embodiment of the present invention.

FIG. 4 is a flowchart illustrating a method of supplementing brake vacuum pressure in the apparatus for controlling brake vacuum pressure according to an exemplary embodiment of the present invention.

Figure 1:
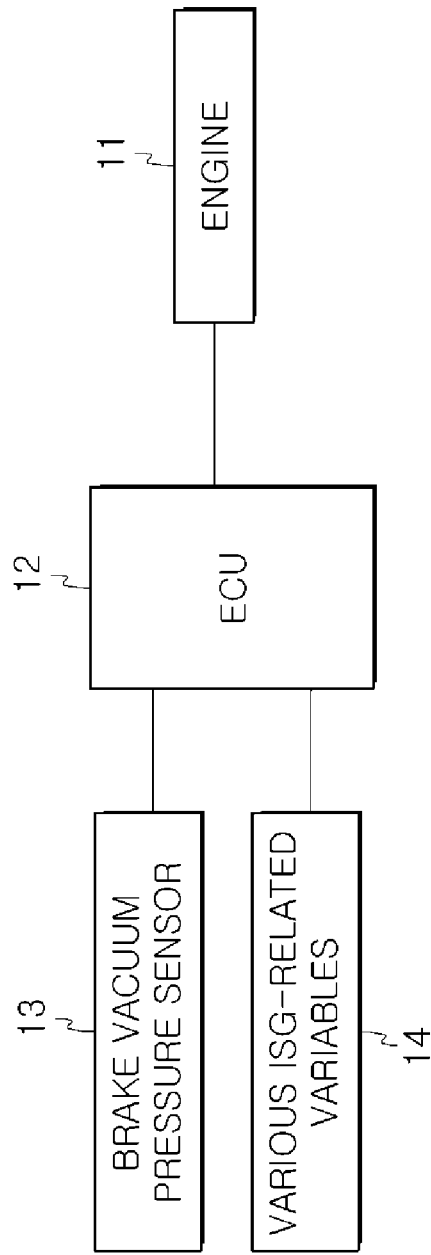
FIG. 1 is a diagram schematically illustrating an ISG system of the related art.
Figure 2:
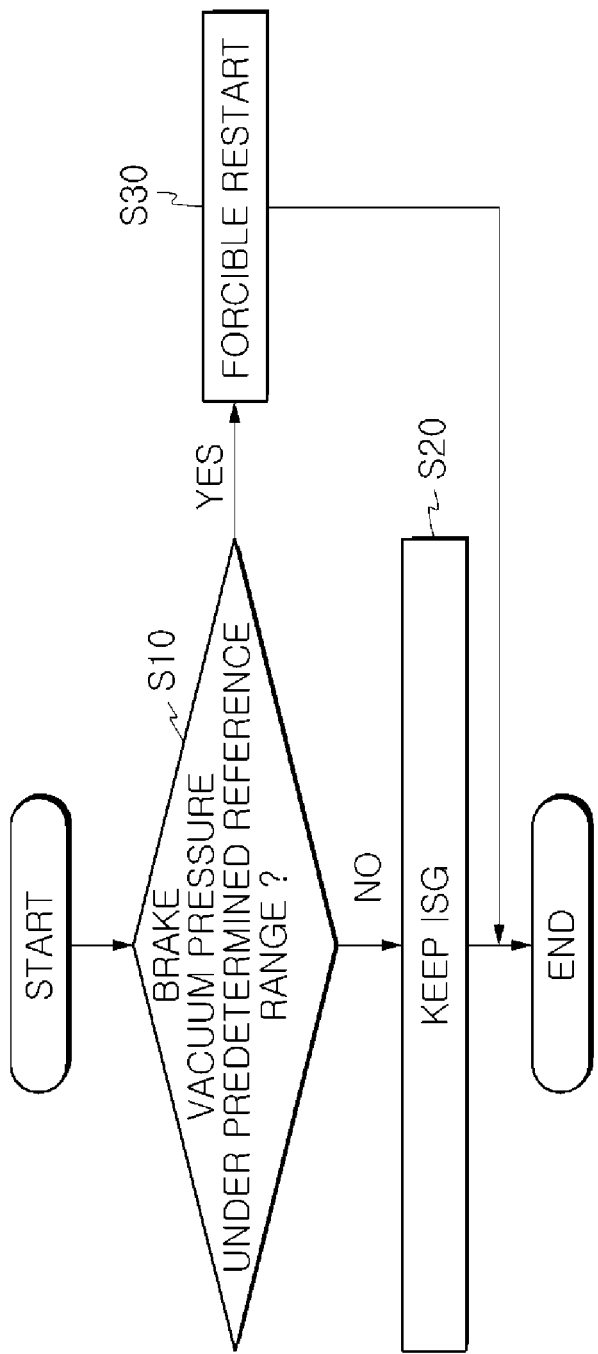
FIG. 2 is an operational flowchart of the ISG system of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in detail with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Therefore, the shape and size of the components shown in the drawings may be exaggerated for more clear explanation.

Referring to FIG. 3, the operation of an engine 140 of a vehicle is controlled by an engine control unit (ECU) 110. A brake vacuum pressure sensor 150 that senses brake vacuum pressure is connected to ECU 110 and the brake vacuum pressure sensed by brake vacuum pressure sensor 150 is inputted to ECU 110.

Further, the operation of a sub-oil pump 131 that generates hydraulic pressure and supplies the hydraulic pressure to an automatic transmission 120 in order to keep the internal hydraulic pressure of automatic transmission 120 when engine 140 stops is controlled by ECU 110.

A vacuum pump 132 is connected to a driving shaft 131a of sub-oil pump 131 through an electronic clutch 133. As electronic clutch 133 is connected, power of driving shaft 131a of the sub-oil pump is transmitted to a vacuum pump 132 through electronic clutch 133 and vacuum pump 132 operates with the sub-oil pump. As electronic clutch 133 is disconnected, vacuum pump 132 cannot be supplied with the power from sub-oil pump 131 and cannot operate.

ECU 110 determines whether to implement ISG on the basis of ISG conditions and keeps the brake vacuum pressure within a predetermined reference vacuum pressure range by controlling vacuum pump 132 after implementing the ISG, thereby supplementing the brake vacuum pressure.

In detail, ECU 110 determines whether to implement the ISG on the basis of input signals transmitted from engine 140, automatic transmission 120 and brake vacuum pressure sensor 150. The ISG conditions are all conditions required to determine whether to stop engine 100 when a vehicle implements the ISG, and are determined in advance by experiments.

Further, ECU 110 receives a brake vacuum pressure signal based on measured brake vacuum pressure from brake vacuum pressure sensor 150, when the ISG conditions are satisfied and the vehicle implements the ISG. ECU 110 determines whether the value of the brake vacuum pressure signal is included in the reference vacuum pressure range.

ECU 110 keeps the ISG by determining that the brake vacuum pressure is stable, when the value of the brake vacuum pressure signal is included in the reference vacuum pressure range.

Meanwhile, ECU 110 generates a vacuum pressure control signal by determining that the value is out of the stable reference, when the value of the brake vacuum pressure signal is not included in the reference vacuum pressure range.

Further, ECU 110 supplements the brake vacuum pressure by sending a vacuum pressure control signal to electronic clutch 133 such that vacuum pump 132 operates.

Automatic transmission 120 keeps the internal hydraulic pressure, using sub-oil pump 131, because excessive shock may be generated, with hydraulic pressure not applied, when engine 140 needs to be rapidly restarted after stopping.

That is, ECU 110 operates sub-oil pump 131 by sending a control signal to sub-oil pump 131 when the ISG is implemented and the engine stops, the hydraulic pressure pumped by sub-oil pump 131 is supplied to automatic transmission 120 by the operation of sub-oil pump 131, such that the shortage of hydraulic pressure inside the automatic transmission due to stopping of the operation of the engine is supplied.

In this operation, ECU 110 operates sub-oil pump 131 by calculating a desired rotation speed and sending a control signal corresponding to the rotation speed to sub-oil pump 131.

Further, as the vacuum pressure control signal is sent to electronic clutch 133 by ECU 110, electronic clutch 133 is connected and vacuum pump 132 is connected to driving shaft 131a of sub-oil pump 131 to be able to receive power, such that vacuum pump 132 operates, and generates and supplies required brake vacuum pressure to the brake system, and thus, stable operation of the brake is achieved.

As shown in FIG. 4, ECU 110 of the apparatus for controlling brake vacuum pressure according to an exemplary embodiment of the present invention receives a brake vacuum pressure signal from brake vacuum pressure sensor 150 in order to determine whether to supplement the brake vacuum pressure after the ISG conditions are satisfied and the ISG is implemented (S100). ECU 110 determines whether the value of the brake vacuum pressure signal is included in the reference vacuum pressure range (S110).

As a result of the determination in S110, when the value of the brake vacuum pressure signal is not included in the reference vacuum pressure range, ECU 110 determines that the brake vacuum pressure is out of the stable reference, and generates and sends a vacuum pressure control signal to electronic clutch 133 (S 120).

In detail, ECU 110 sends a control signal corresponding to the desired rotation speed to sub-oil pump 131 such that the sub-oil pump operates and required flow rate and hydraulic pressure are generated in the automatic transmission, and also sends a brake vacuum pressure signal to electronic clutch 133 such that the electronic clutch is connected. Accordingly, power for operating the vacuum pump is transmitted to the vacuum pump from the sub-oil pump through the electronic clutch and appropriate vacuum pressure is generated by the operation of vacuum pump 132, such that the insufficient brake vacuum pressure due to stopping of the operation of the engine is supplemented.

Meanwhile, as a result of the determination in S110, when the value of the brake vacuum pressure signal is in the reference vacuum pressure range, ECU 110 determines that the brake vacuum pressure is made stable, such that the ISG is maintained (S140).

As described above, the apparatus for controlling brake vacuum pressure according to an exemplary embodiment of the present invention supplements brake vacuum pressure by using vacuum pump 132 connected with the same shaft as sub-oil pump 131 for keeping the internal hydraulic pressure of automatic transmission 120, such that it is possible to keep the brake vacuum pressure more stable. As the brake vacuum pressure is kept in the stable range, as described above, the time for keeping the ISG to improve fuel efficiency may increase and forcible restart of the engine due to the lack of brake vacuum pressure is prevented, such that reliability of the vehicle can be improved.

As described above, the optimum embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for supplementing a brake vacuum pressure, comprising:
    an engine control unit (ECU) that generates a vacuum pressure control signal for supplementing the brake vacuum pressure in accordance with the result of determining whether the brake vacuum pressure is included in a reference vacuum pressure range after a vehicle implements an idle stop and go (ISG) process;
    a sub-oil pump that is operated in accordance with a control signal from the ECU to supply hydraulic pressure to the inside of an automatic transmission after the vehicle implements the ISO process;
    a vacuum pump that generates and supplies the brake vacuum pressure to a brake system; and
    an electronic clutch that selectively couples the sub-oil pump and the vacuum pump to allow driving force of the sub-oil pump to be transmitted to the vacuum pump or to be cut, in accordance with whether the vacuum pressure control signal is sent thereto.

2. The apparatus for supplementing brake vacuum pressure as defined in claim 1, wherein the vacuum pressure control signal includes a desired rotation speed signal including information of a revolution per minute (RPM), which is set for the brake vacuum pressure to be supplemented and a clutch control signal for controlling the electronic clutch.

3. The apparatus for supplementing brake vacuum pressure as defined in claim 1, wherein the ECU keeps the ISG process while the brake vacuum pressure is determined to be stable when the brake vacuum pressure is included in the reference vacuum pressure range.

4. The apparatus for supplementing brake vacuum pressure as defined in claim 1, wherein the ECU generates the vacuum pressure control signal to the electronic clutch while the brake vacuum pressure is determined to be unstable when the brake vacuum pressure is not included in the reference vacuum pressure range.

5. A vehicle comprising the apparatus as defined in claim 1.

6. A hybrid vehicle comprising the apparatus as defined in claim 1.

7. An electric vehicle comprising the apparatus as defined in claim 1.

8. A method of supplementing a brake vacuum pressure in an apparatus for supplementing the brake vacuum pressure which includes a sub-oil pump and a vacuum pump selectively connected to a driving shaft of the sub-oil pump through an electronic clutch, the method comprising:

determining whether the brake vacuum pressure is included in a reference vacuum pressure range after a vehicle implements an idle stop and go (ISG) process;

generating a vacuum pressure control signal to the electronic clutch to supplement the brake vacuum pressure in accordance with the determined result;

operating the vacuum pump by using driving force of the sub-oil pump, by transmitting the vacuum pressure control signal to the electronic clutch when the brake vacuum pressure is determined to be in the reference vacuum pressure range; and supplying the brake vacuum pressure generated from the vacuum pump to a brake system.

9. The method of supplementing brake vacuum pressure as defined in claim 8, wherein the determining includes:

keeping the ISG process while that the brake vacuum pressure is determined to be stable when the brake vacuum pressure is included in the reference vacuum pressure range; and generating the vacuum pressure control signal while the brake vacuum pressure is determined to be unstable when the brake vacuum pressure is not included in the reference vacuum pressure range.

10. The method supplementing brake vacuum pressure as defined in claim 8, wherein the vacuum pressure control signal includes a desired rotation speed signal including an RPM (Revolution Per Minute), which is set for the brake vacuum pressure to be supplemented and a clutch control signal for controlling the electronic clutch connecting the sub-oil pump with the vacuum pump.

\* \* \* \* \*